Patented Aug. 30, 1927.

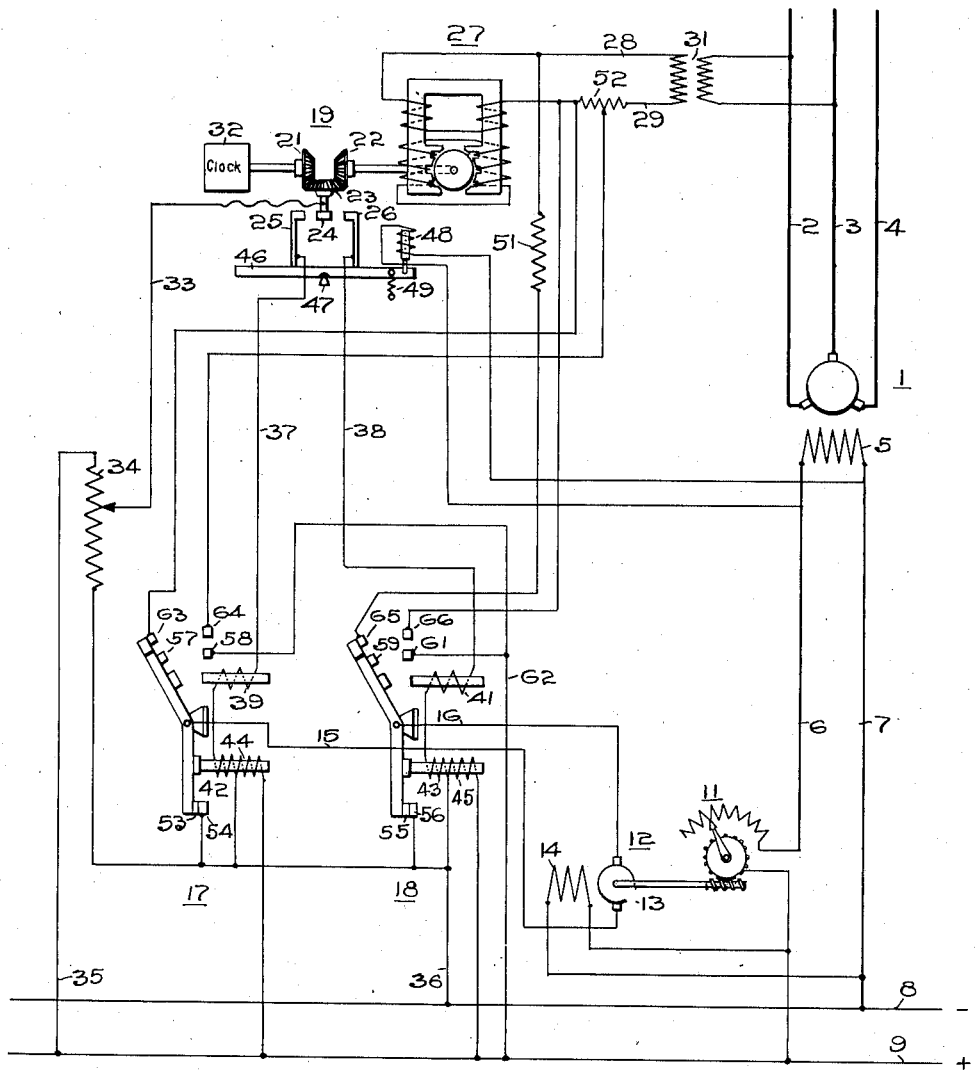

1,640,560

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

VOLTAGE-REGULATOR SYSTEM.

Application filed June 23, 1925. Serial No. 39,046.

My invention relates to regulator systems and more particularly to systems for governing the voltage of electric generators.

One object of my invention is to provide a regulator in which the corrective tendency is cumulative, accurate and quick-acting.

Another object of my invention is to provide a regulator of the above-indicated character with a plurality of anti-hunting means.

My invention contemplates the use of a mechanical differential device that acutates a contact member, and a pair of co-operating contact members movably mounted to be actuated in such a manner as to prevent hunting action. One side of the mechanical differential device is actuated by a clock mechanism or a synchronous motor at a predetermined speed corresponding to the voltages to be maintained upon the regulated generator. The other side of the differential device is actuated by an induction voltmeter or by a motor that is operated at a rate of speed that is proportional to the regulated voltage. Anti-hunting means are also provided to modify the operation of the induction voltmeter to prevent hunting action of the system.

My invention will be better understood by reference to the accompanying drawing, wherein the single figure is a diagrammatic view of circuits and apparatus embodied in a preferred form of my invention.

Referring to the drawing, a generator 1 is connected to a power circuit 2, 3, 4 and is provided with a field winding 5 that is connected by means of leads 6 and 7 to direct-current supply conductors 8 and 9 that supply the excitation current. In circuit with the field winding 5, a rheostat 11 is provided to vary the impressed field voltage, and this rheostat is operated by a pilot motor 12 that comprises an armature winding 13 and a field winding 14. The field winding 14 is connected directly to the supply conductors 8 and 9 and the armature winding is connected by means of leads 15 and 16 to reversing switches 17 and 18, respectively.

A mechanical differential device 19 is provided for operating the reversing switches 17 and 18 in a manner to be later described. The mechanical differential device comprises end or sun gear wheels 21 and 22 and a planetary gear-wheel 23, the latter operating an intermediate contact member 24 that is adapted to engage the one or the other of a pair of co-operating contact members 25 and 26.

One of the gear-wheels 22 of the differential device is operated by an induction voltmeter, of well-known form, or other motor device 27, which is connected by means of leads 28 and 29 to a transformer 31 that is connected to be responsive to the voltage across one phase of the generator 1. The other side of the mechanical differential is connected to be actuated at a constant speed by a clock device or a synchronous motor 32.

The contact member 24 is adjustably connected, by means of a conductor 33, to a resistor 34 that is connected by means of conductors 35 and 36, across the supply conductors 8 and 9. The contact members 25 and 26 are connected by means of conductors 37 and 38, respectively, to the operating coils 39 and 41 of the reversing switches 17 and 18. The circuits of the operating coils 39 and 41 include coils 42 and 43, respectively, which are wound on separate cores from coils 39 and 41 to operate as de-energizing coils and are differentially wound with respect to holding coils 44 and 45. The holding coils are permanently energized, so that the switches 17 and 18, are held in the positions shown on the drawing when the circuits of the operating coils 39 and 41 are de-energized.

A lever 46, pivotally mounted at an intermediate point 47, is provided to carry the contact members 25 and 26, and the position of the lever is varied by an electromagnet 48, which is located near one end of lever 46 and is energized in accordance with the voltage impressed upon the generator field winding 5. The electromagnet 48 operates, against the pull of a spring member 49, to prevent hunting action in the system. Anti-hunting resistors 51 and 52 are also provided and are connected so as to decrease or to increase the voltage that is applied to the induction voltmeter upon the closure of reversing switch 17 or reversing switch 18. Resistor 51 is adapted to be connected in shunt relation to the field coils of induction voltmeter 27, while resistor 52 is connected in series relation therewith.

The operation of the regulator system is as follows: The clock device 32 is adjusted to operate at a speed that corresponds to the voltage at which the generator 1 is intended to operate. If the induction voltmeter 27 operates at the same speed as the clock mechanism 32, the excitation of the generator will remain unchanged, the contact member 24 then occupying its illustrated inoperative position. Should the speed of the induction voltmeter decrease or increase with respect to the clock mechanism, in accordance with the voltage of power circuit 2, 3, 4, the differential device 19 will operate in such a manner as to cause the contact member 24 to engage the contact member 25, or the contact member 26, thus closing a circuit through the conductors 35 and 33, and one of the conductors 37 or 38 to operate the reversing switch 17 or the reversing switch 18.

In the positions of the reversing switches 17 and 18 as illustrated, a dynamic braking circuit is completed through the armature 13 of the pilot motor, including conductors 15 and 16, lower contact members 53 and 54 of the switch 17 and lower contact members 55 and 56 of the switch 18. As the reversing switch 17 is operated to a position disengaging lower contact members 53 and 54 and engaging upper contact members 57 and 58, conductor 15 will be connected, through conductor 62 to supply conductor 9, thus causing the pilot motor 12 to rotate in one direction.

As the reversing switch 18 is operated to a position disengaging lower contact members 55 and 56 and engaging upper contact members 59 and 61, conductor 16 will be connected through conductor 62 to supply conductor 9 thus causing the pilot motor to be operated in the other direction. In this way, the rheostat 11 is operated to suitably vary the voltage of the generator field winding 5.

Upon the operation of reversing switch 17 from the position illustrated, supplementary contact members 63 and 64 are engaged to complete a circuit in shunt relation to the resistor 52, thus increasing the voltage applied to the induction voltmeter 27. In a similar manner, upon the operation of switch 18 from the position illustrated, the engagement of supplementary contact members 65 and 66 will complete a circuit through resistor 51 in shunt relation to the induction voltmeter, thus causing the applied voltage to decrease. The temporary increase or decrease of the voltage applied to the induction voltmeter 27, with respect to that corresponding to the generator voltage, modifies the action of the regulator during the operation of the motor-operated rheostat to prevent hunting of the system.

The operation of the lever 46, carrying contact members 25 and 26, in accordance with the voltage impressed upon the generator field winding 5 also acts as an anti-hunting means. Since the voltage impressed upon the generator field winding 5 increases or decreases as a result of the operation of the rheostat 11 in the one or the other direction, the lever 46 is moved in a direction that will disengage the contact member 24 from the one or the other contact members 25 or 26 at the proper instant and thus prevent hunting action.

Many changes may be made in the details and arrangement of the apparatus and the circuits disclosed without departing from the spirit of my invention, and I do not wish to be limited other than by the scope of the appended claims.

I claim as my invention:

1. In a regulator system, a dynamo-electric machine, means for varying the excitation of said dynamo-electric machine comprising a differential device, a contact member actuated thereby, a pair of contact members co-operating therewith, a clock mechanism for actuating one side of said differential device, electro-responsive means energized in accordance with the voltage of said dynamo-electric machine for actuating the other side of said differential device, and means energized in accordance with the excitation of said machine for actuating said pair of contact members to prevent hunting action.

2. In a regulator system, an electric generator, means for regulating the excitation of said generator comprising a differential device, a contact member actuated thereby, a pair of contact members co-operating therewith, a clock mechanism for actuating one side of said differential device, an electro-responsive means energized in accordance with the voltage of said generator for actuating the other side of said differential device, anti-hunting means for said electro-responsive means, and means energized in accordance with the excitation of said machine for actuating said pair of co-operating contact members to prevent hunting action of said regulating means.

3. In a regulator system, an electric generator, a contact member, an induction voltmeter responsive to the generator voltage for actuating said contact member, a pair of contact members actuated in accordance with the excitation of said generator for co-operating with said first-named contact member, means controlled by said contact members for varying the energization of said generator, and means for modifying the action of said induction voltmeter to prevent hunting action.

4. In a regulator system, an electric generator, a contact member, an induction voltmeter responsive to the generator voltage for actuating said contact member, a pair of contact members actuated in accordance with the excitation of said generator for co-operating with said first-named contact member, and means controlled by said contact members for varying the excitation of said generator.

5. In a regulator system, an electric generator, a contact member, a differential device for actuating said contact member, a constant-speed device for actuating one side of said differential device, an induction voltmeter responsive to the generator voltage for actuating the other side of said differential device, a pair of contact members actuated in accordance with the excitation of said generator for co-operating with said first-named contact member, and means controlled by said contact members for varying the excitation of said generator.

6. In a regulator system, an electric generator, a contact member, a differential device for actuating said contact member, a constant-speed device for actuating one side of said differential device, an induction voltmeter responsive to the generator voltage for actuating the other side of said differential device, a pair of contact members actuated in accordance with the excitation of said generator for co-operating with said first-named contact member, means controlled by said contact members for varying the excitation of said generator, and means for modifying the action of said induction voltmeter to prevent hunting action.

In testimony whereof, I have hereunto subscribed my name this 5th day of June 1925.

WM. M. BRADSHAW.